Nov. 18, 1941.   E. L. BEECHER   2,263,284

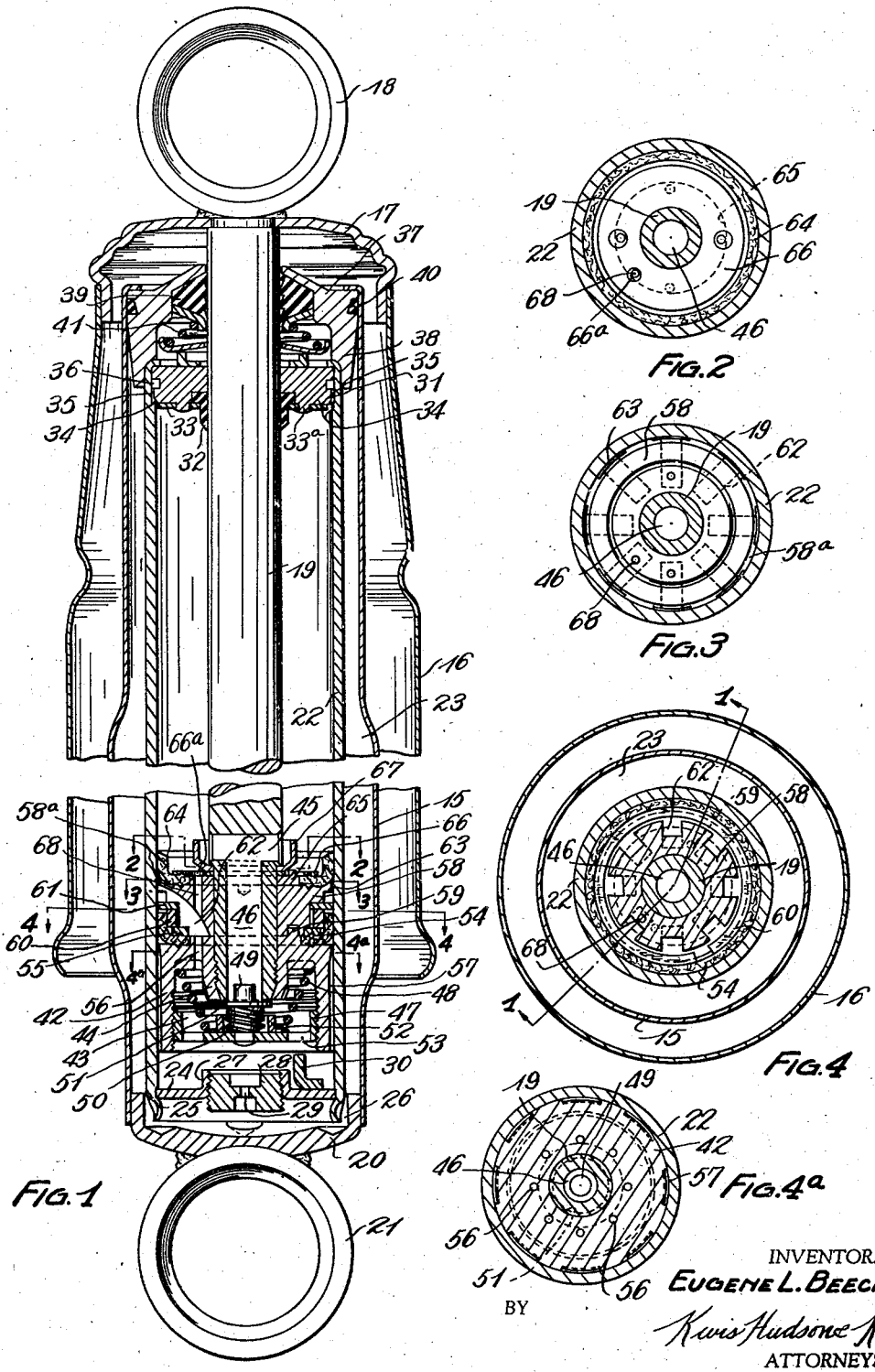

SHOCK ABSORBER

Filed Feb. 2, 1940   2 Sheets-Sheet 2

OPEN ORIFICE TYPE
50 S.P.M.

OPEN ORIFICE TYPE
50-100-150-200 S.P.M.

CLOSED ORIFICE TYPE
50 S.P.M.

CLOSED ORIFICE TYPE POP OFF VALVE
50-100-150-200 S.P.M.

COMPOUND ACTION TYPE
50 S.P.M.

COMPOUND ACTION TYPE
50-100-150-200 S.P.M.

COMPOUND ACTION TYPE WITHOUT FLUID
SHOWING MECHANICAL RESISTANCE
AT 50 S.P.M.

INVENTOR.
EUGENE L. BEECHER
BY
Kwis Hudson & Kent
ATTORNEYS

Patented Nov. 18, 1941

2,263,284

UNITED STATES PATENT OFFICE 2,263,284

SHOCK ABSORBER

Eugene Lester Beecher, Cleveland Heights, Ohio, assignor to The Gabriel Company, Cleveland, Ohio, a corporation of Ohio Application February 2, 1940, Serial No. 317,006

12 Claims. (Cl. 188—88)

This invention relates to a shock absorber and particularly to a direct compound acting hydraulic shock absorber.

An object of the invention is to provide a direct compound acting hydraulic shock absorber which is so constructed that in operation it will have improved shock absorber characteristics and will impart to vehicles equipped with the same smooth and desirable riding qualities.

A further object of the invention is to provide a direct compound acting hydraulic shock absorber which is so constructed as to have in use the desirable characteristics of both the open orifice type and the closed orifice type of shock absorber and, in addition, to have sought-for characteristics not obtainable in either of the above mentioned types of shock absorbers and which characteristics are present during both the impact stroke and the recoil stroke of the piston of the shock absorber.

Shock absorbers heretofore used on motor vehicles usually have been designed for vehicles wherein the bodies are mounted on leaf spring suspensions. At the present time there is an increased tendency to employ coil spring suspensions for the bodies of motor vehicles. It has been found that shock absorbers which function satisfactorily upon vehicles of the leaf spring suspension type do not so function when used on vehicles of the coil spring suspension type.

In the leaf spring suspension there is an appreciable amount of frictional resistance between the leaves of the springs to the relative compression and recoil movements thereof. This frictional resistance has a decided effect on the riding qualities of the vehicle and on the functional characteristics of the shock absorbers used therewith.

However, the coil spring type of vehicle suspension is different, in that there is no frictional resistance or drag between the different elements or coils of the springs, and consequently a shock absorber which may function satisfactorily upon vehicles of the leaf spring suspension type will not function satisfactorily upon vehicles of the coil spring suspension type.

It has been found that vehicles of the coil spring suspension type when equipped with shock absorbers which have been satisfactory upon vehicles of the leaf spring suspension type do not have the desired and required riding qualities, but, on the contrary, have rough sudden movements of large amplitude causing considerable discomfort to the passengers in the vehicle.

Various expedients have been resorted to to overcome this disadvantage in connection with vehicles of the coil spring suspension type as, for example, the use of multiple pairs of shock absorber devices, and particularly devices of the link and lever actuated type as distinguished from the direct acting hydraulic shock absorber. None of these expedients have proven satisfactory and furthermore they are expensive in that they necessitate the use of multiple shock absorber devices with a resultant increased cost of manufacture and installation.

An important object of the present invention is to provide a fluid shock absorber which is so constructed that it will function satisfactorily even when used on vehicles of the coil spring suspension type and will impart to said vehicles the desired and required riding qualities.

A further object is to provide a fluid shock absorber which is so constructed as to have built into the device itself a frictional resistance or drag comparable to and taking the place of the frictional resistance or drag present between the leaves of leaf spring suspensions for motor vehicles.

Further and additional objects and advantages not hereinbefore referred to will become apparent hereinafter during the detailed description which is to follow of an embodiment of the invention and which is illustrated in the accompanying drawings wherein Fig. 1 is a longitudinal sectional view through a shock absorber embodying the invention and is taken substantially on line 1—1 of Fig. 4 looking in the direction of the arrows.

Fig. 2 is a transverse sectional view taken substantially on irregular line 2—2 of Fig. 1 looking in the direction of the arrows.

Fig. 3 is a transverse sectional view taken substantially on line 3—3 of Fig. 1 looking in the direction of the arrows, with certain parts omitted.

Fig. 4 is a transverse sectional view taken substantially on line 4—4 of Fig. 1 looking in the direction of the arrows.

Figure 5:
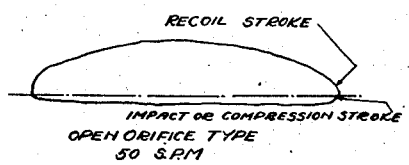

Fig. 4ª is a transverse sectional view taken substantially on line 4ª—4ª of Fig. 1, looking in the direction of the arrows, and Figs. 5 to 11 inclusive are curves or work diagrams constituting a comparison chart between the open orifice type of shock absorber, the closed orifice type of shock absorber and the compound action type of shock absorber embodying the present invention.

The shock absorber embodying the present invention and illustrated in the accompanying drawings is shown by way of illustration as of the direct double acting hydraulic type and comprises a substantially cylindrical casing 15 which has relative telescoping movement within a cylindrical housing 16 that is spaced radially outwardly from the casing 15. The upper end of the housing 16 is closed by an inverted cup-shaped closure or cap member 17 provided on its outer side with an eye 18 with which the piston rod 19 is integral or is operatively connected thereto. The lower end of the casing 15 is closed by a cup-shaped closure member 20 which has secured to its outer side a lower eye 21. The closure members 17 and 20 extend into the housing 16 and the casing 15, respectively, and are secured thereto by welding or by other suitable means.

In mounting the shock absorber upon a motor vehicle similar mounting pins or trunnion rods (not shown) may be connected, respectively, to the frame and axle of the vehicle in any suitable manner so as to extend outwardly therefrom in parallel relationship and pass through the eyes 18 and 21. These pins or rods may be operatively connected with the eyes 18 and 21 by suitable means well known in the art, wherefore relative movement between the frame and axle of the vehicle will cause relative telescoping movement between the casing 15 and the housing 16 and relative movement of the piston in the pressure or working cylinder as will be well understood.

The pressure or working cylinder 22 of the shock absorber is disposed within the casing 15 in spaced concentric relationship therewith so that the space defined by the casing 15, cylinder 22, closure member 20 and a closure member for the upper end of the casing (later to be referred to) constitutes a reservoir 23 for the oil or liquid in the shock absorber.

The lower end of the cylinder 22 extends into the cup-shaped closure member 20 and is secured thereto by suitable means understood in the art. The cylinder 22 slightly upwardly of its lower end has secured therein a closure plate 24. The cylinder 22 below the closure plate 24 is provided with an inwardly extending bead 25 which serves to retain the closure plate 24 in position, while the cup-shaped closure member 20 is provided with a plurality of circumferentially spaced internal grooves or channels 26 which place the reservoir 23 in communication with the space between the closure plate 24 and the bottom of the cup-shaped closure member 20.

The closure plate 24 is provided with a centrally disposed opening surrounded by an internally threaded boss 27 and into which a threaded plug 28 is screwed, said plug being provided with a small centrally located opening 29 for a purpose later to be explained. The closure plate 24 also has secured to its inner side an inwardly projecting finger 30 that cooperates with an adjustable part carried by the piston for the purpose of adjusting the tension of a valve spring, as will later be explained.

The upper or high pressure end of the cylinder 22 is closed by a plug member 31 which fits into the cylinder and is suitably secured in position therein, it being noted that the upper edge of the cylinder is turned inwardly over the outer side of the plug member. The plug member 31 is provided with a centrally disposed opening arranged concentrically with a counterbore on the inner side of the member and in which is located a flanged portion of an elastic sleeve 32. The sleeve 32 is held in position by a thin plate 33 secured to the inner side of the member 31 by suitable means, such as the integral rivet-like portions 33a that extend through openings in the plate 33 and then have their ends upset against the plate.

The piston rod 19 extends through the central opening in the member 31 and through the elastic sleeve 32. The elastic sleeve 32 tightly grips the piston rod and acts as a seal to prevent oil and air working out of the cylinder 22 along the piston rod 19. In other words, the elastic sleeve 32 eliminates likelihood of any uncontrolled air passages between the piston rod 19 and the wall of the opening in the member 31. If such passages existed the result would be an atomization of oil foam through the passages to the outside of the cylinder and this would cause an undesirable hissing or whistling noise in the operation of the shock absorber. The elastic sleeve 32 will always tightly grip the piston rod and even though considerable clearance should eventually be present between the rod and the wall of the opening in the member 31, due to wear of the parts, the sleeve will still adequately function as a seal to close the passage around the piston rod.

The plate 33 has its circumference terminating slightly inwardly of the circumference of the member 31, while said member 31 is provided adjacent its inner side and on its circumference with circumferentially spaced inclined notches 34 that merge at their upper ends into small grooves 35. The grooves 35 have their upper ends in communication with an annular channel 36 formed in the circumference of the member 31 substantially midway between the outer and inner ends of the member.

The upper end of the casing 15 is closed by a closure member 37 mounted in the casing and suitably connected thereto. The closure member 37 is provided with inwardly extending portions 38 that contact with the upper end of the cylinder 22, as clearly shown in Fig. 1. The member 37 is also provided with a centrally disposed recess in which is arranged a gasket 39. The piston rod 19 extends through this gasket 39 and through a centrally located opening in the member 37. The member 37 is provided with a peripheral groove in which is mounted a packing ring 40 located within the casing 15 and forming a tight seal between the casing and the member 37. The gasket 39 is held under compression by a coil spring 41 acting on the tapered inner end of the gasket, as clearly shown in Fig. 1, but since this particular detail forms no part of the present invention it is not believed necessary to describe the same specifically.

The piston rod 19 has secured to its lower end a piston which comprises a portion 42 and which portion is provided on its lower side or end with a cylindrical recess 43 at the upper end of which is a centrally located extension 44 that surrounds the lower end of the piston rod 19 and is secured and locked thereto. A transverse opening 45 is formed in the piston rod 19 above or inwardly of the piston and this opening communicates with a longitudinally extending passage 46 that extends to the lower end of the piston rod and is in communication with the recess 43 in the piston portion or member 42.

An externally threaded cup-shaped plug 47 is screwed into the recess 43 of the piston portion 42 and is locked in different adjusted positions by the tension of a relatively stiff coil spring 48 mounted in the recess 43 and having one of its ends abutting against the bottom of the cup-shaped plug 47 and its other end against the piston portion or member 42.

Rigidly connected to the bottom of the plug 47 is a centrally disposed pin 49 that extends upwardly into the passage 46 in the piston rod 19. A small coil spring 50 surrounds the pin 49 and has its upper end abutting against a plate valve 51 that is slidably mounted on the pin 49 and is held by the spring 50 normally seated against the lower end of the piston rod to seal the passage 46. This arrangement of the pin 49 and valve plate 51 possesses a decided advantage. Flat valves ordinarily have a tendency to crack open on one side first with the result that in order to accommodate the volume of expelled fluid the movement of the valves sidewise is more than if the valves opened evenly. This sidewise opening movement of the valves causes valve flutter and often produces in shock absorbers thumping noises. The use of adequate guides for the valves may correct this fault but the guides cause objectionable weight to be introduced into the shock absorber.

In the present construction the pin 49 has a relatively large diameter and since it extends into the passage 46 an annular space is provided between the pin and the wall of the passage. Therefore the valve 51 has an exposed pressure area of annular shape and located substantially near the circumference of the valve, wherefore there will be an even pressure distribution on the valve 51 and the latter will move to and from its seat in parallel relation to the axis of the pin 49 and the plate of the valve 51 will be substantially perpendicular to said axis. Also, since the area of the valve is reduced by the area of the pin 49, a much lighter spring pressure is required for the expelled volume of oil.

A ring 52 also surrounds the pin 49 and is for the purpose of preventing a complete collapse of the spring 50 when the valve 51 is moved to closed position upon manual adjustment of the plug member 47. The movement of the valve 51 under the pressure of the oil is only a few thousandths of an inch.

The plug member 47 is provided with a plurality of openings 53 which can be engaged by the finger 30 on the closure member 24 when the piston is in its most inward position, so that relative rotation between the cylinder 22 and the piston will cause the member 47 to be screwed inwardly or outwardly of the recess 43, with a resultant change in the tension of the spring 50 and consequently in the pressure required for opening the valve 51.

A flexible cup packing ring 54, preferably formed of leather, is arranged on the upper end of the piston portion or member 42 and is held in position thereon by means of an annular washer 55 which, in turn, is held in position by another piston portion later to be referred to. One or more small passages 56 extend through the piston portion 42 and communicate with the space above said portion and with the recess 43, there being eight equally spaced passages 56 illustrated in the present instance. The portion 42 of the piston is provided on its periphery with a plurality of longitudinally extending relatively broad grooves 57 which are spaced circumferentially of the piston portion and which, as indicated in Fig. 1, are of gradually diminishing depth from a point somewhat below the upper or inner end of the piston portion 42 to their upper ends. The grooves 57 at their upper ends are of such depth that the flexible cup packing 54 overlies the same and is backed up by the portion 42 of the piston. The purpose of these grooves 57 will be explained hereinafter in greater detail.

A second piston portion, which might be termed a piston head, is indicated at 58 and is fixed on the piston rod 19 above the portion 42 and has its lower end in engagement with the upper end of the portion 42 and connected thereto by a pin and socket connection indicated at 59. The end of the portion or piston head 58 adjacent to the piston portion 42 is reduced in diameter and is shouldered to bear upon the annular washer 55.

Above the washer 55 the periphery of the piston head 58 is provided with a second annular shoulder and defines with the cup-shaped packing ring 54 an annular space in which is located a split expansion ring 60 which bears against the inner surface of the wall of the flexible packing ring with a predetermined pressure and is held in position by a retainer 61 which, in turn, is clamped in position by the last mentioned annular shoulder portion of the periphery of the piston head 58, all as clearly shown in Fig. 1. The purpose of the expansion ring 60 will be pointed out hereinafter in greater detail.

The piston head at its inner or upper end is slightly dished to provide a rim portion 58a contacting on its periphery with the inner surface of the working cylinder 22. The piston head or portion 58 is also provided with a plurality of circumferentially spaced channels 62 that extend downwardly and inwardly from just below the rim 58a to the inner or lower end of the head 58, as clearly indicated in Fig. 1. In the present instance, and by way of illustration, eight of these channels 62 are indicated in Figs. 3 and 4, and said channels overlie and are in communication with the eight passages 56 in the piston portion 42.

The channels 62 at their upper ends are in communication with peripheral grooves 63 formed in the rim 58a and extending to the upper end thereof, see Fig. 3. The grooves 63 are of greater arcuate width than the channels 62 and form a plurality of passages between the piston head 58 and the inner surface of the cylinder 22 and connect the upper ends of the channels 62 with the interior of the working cylinder above the piston.

The dished end of the piston head 58 that is provided with the rim 58a has mounted thereon a flexible cup packing ring 64, the wall of which engages with the inner surface of the cylinder 22. An annular spacer washer 65 surrounds the piston rod 19 and is located within the opening in the flexible cup packing ring 64 and bears against the dished end of the piston head 58, as clearly indicated in Fig. 1. The annular washer 65 is provided on one side with a pin-like projection that extends into an opening in the piston head 58 and on its other side with similar projections that extend into openings formed in a plate 66 that serves to clamp the flexible cup packing ring 64 in position on the dished end of the piston head 58.

A small cup member 67 is locked in position on the piston rod 19 just above the plate 66 and this cup is of such size as to partially surround the opposite ends of the opening 45 in the piston rod and acts as a stop when the shock absorber is fully extended to prevent damage to the elastic sleeve 32 and the cup packing ring 64.

One of the openings in the plate 66, namely the opening indicated at 66a in Fig. 2, overlies a small passage 68 formed in the piston head 58 and extending from the dished end thereof into one of the channels 62 that overlies one of the small passages 56 in the piston portion 42, as clearly indicated in Fig. 1, wherefore said one passage 56 and the passage 68 are in communication with each other through the said one channel 62, with the result that portions of the working cylinder on opposite sides of the piston always have a constant restricted communication with each other and through which oil may flow as the piston moves in either direction in the cylinder.

Assuming that the shock absorber is mounted upon a motor vehicle and is filled with liquid such as oil, it will be understood that when the wheels of the vehicle strike an irregularity or bump in the roadway the impact will compress the vehicle springs and cause the axle to move toward the chassis, with a resultant downward movement, as viewed in the drawings, of the piston in the cylinder 22. During this downward movement of the piston on the impact or compression stroke the oil in the cylinder flows through the eight passages 56 in the piston portion 42 and through the eight channels 62 and peripheral grooves 63 and between the wall of the cup packing ring 64 and the wall of the cylinder 22. The liquid also flows through the single constantly opened orifice or passage 68 in the cylinder head 58. In other words, there is a relatively free flow of liquid from below the piston to above the piston during the compression stroke.

Of course, since the oil displaced by the piston rod 19 must flow through the relatively small opening 29 of the closure plate 24 and into the reservoir 23 a predetermined hydraulic resistance or shock absorbing action is provided for the impact or compression stroke.

During the impact or compression stroke the oil will pass upwardly of the peripheral grooves 57 of the piston portion 42, but no substantial part of this oil will pass the cup packing ring 54, due to the action of the split expansion ring 60 which maintains the packing ring in tight sealing engagement at all times with the inner wall of the cylinder 22. The oil which passes upwardly of the grooves 57 merely acts in a lubricating capacity.

Since the split expansion ring 60 bears against the inner surface of the wall of the flexible packing ring 54 with a predetermined pressure a predetermined mechanical or frictional resistance to the movement of the piston in either direction is present at all times.

As previously pointed out herein in the leaf spring type of vehicle spring suspension a certain amount of mechanical or frictional resistance to the movement of the leaves of the spring is always present during both the impact or compression movement of the spring and the recoil movement thereof. This mechanical or frictional resistance to the relative movements of the leaves of the leaf spring has a material effect on the functioning of the shock absorber devices mounted on the vehicle and such devices do not function satisfactorily when mounted on vehicles employing spring suspension of the coil spring type wherein there is no mechanical or frictional resistance to the movements of the different coils or portions of the springs.

It will be seen that the shock absorber of the present invention has included in it as a structural part thereof means for causing a predetermined frictional or mechanical resistance to the relative movement of the piston and cylinder in either direction, and such resistance supplants the mechanical or frictional resistance inherent in spring suspensions of the leaf spring type. Therefore, the shock absorber of the present invention is particularly adapted for use upon motor vehicles employing spring suspension of the coil spring type and wherein there is no mechanical or frictional resistance to the movements of the different spring portions.

Reverting to the functioning of the shock absorber illustrated and described herein, and particularly referring to the manner in which it operates during the recoil stroke upon the termination of the impact or compression stroke previously referred to, it will be understood that the piston during such recoil stroke moves relative to the cylinder 22 in an upward direction as viewed in the drawing. In the course of the upward movement of the piston the pressure of the oil on the upper side of the piston forces the wall of the cup packing ring 64 tightly against the wall of the cylinder and the grooves 63 and channels or passages 62 are sealed against the flow of oil therethrough by said packing ring 64.

As the piston moves upwardly in the cylinder the oil may flow only through the single fixed orifice or passage 68 and through said one of the passages 56 to the lower side of the piston. In other words, there is a fixed or permanently open restricted communication between the opposite sides of the piston through which the oil may flow.

Also during the recoil stroke of the piston the oil from the upper side of the piston will pass into the opening 45 and the passage 46 in the piston rod 19, but cannot pass to the underside of the piston as long as the lower end of the passage 46 is sealed or closed by the plate valve 51. However, as soon as the pressure of the oil above the piston reaches a predetermined point during the course of the recoil stroke of the piston to overcome the adjusted or selected tension of the spring 50, the plate valve 51 will move from its seat under the pressure of the oil and the oil can then flow from the upper side of the piston to the lower side thereof through the opening 45 and passage 46 in the piston rod.

It will be understood that during the recoil stroke of the piston the oil which was displaced by the piston rod 19 during the impact or compression stroke and forced into the reservoir 23 will flow back into the working cylinder on the lower side of the piston through the opening 29 in the closure plate 24, this flow of the oil back into the working cylinder from the reservoir being facilitated by the action of the pneumatic pressure head that was created in the upper sealed end of the reservoir when the oil was forced into the latter during the impact or compression stroke of the piston.

It will also be understood that in addition to the retarding effect of the oil upon the recoil movement of the piston, such movement will be retarded in a predetermined amount by the mechanical or frictional resistance thereto created by the engagement of the cup packing ring 54 with the wall of the cylinder 22 under the action of the split expansion ring 60.

It will be understood by those skilled in the art that it is desirable for a shock absorber to provide a greater shock absorbing action during the recoil stroke than during the impact or compression stroke. This differential in retarding effect during the recoil stroke and the impact or compression stroke is adequately provided for in the shock absorber of the present invention. In this connection it will be observed that there is a substantial flow of oil from the underside of the piston to the upper side thereof during the impact or compression stroke through the eight passages 56 in the piston portion 42 and through the eight channels 62 and grooves 63 as well as through the single fixed orifice or passage 68.

In addition to the certain measure of shock absorbing action present, as the result of the substantial flow just referred to, there is a further shock absorbing action during the impact or compression stroke occasioned by the necessity of the oil displaced by the piston rod 19 flowing through the opening 29 in the closure plate 24 and into the reservoir 23.

During the initial portion of the recoil stroke of the piston the oil at the upper side of the piston can only flow through the single orifice or passage 68 in the piston head to the underside of the piston until the tension of the spring 50 is overcome and the valve 51 unseated.

Therefore the greatest shock absorbing action occurs at the initial portion of the recoil stroke, which is as it should be, since otherwise the desired riding qualities of the vehicle would not be obtained. Of course during the latter portion of the recoil stroke and after the valve 51 has been unseated there will be a substantial flow of oil from the upper side of the piston to the lower side thereof through the opening 45 and the passage 46 in the piston rod 19.

Figs. 5 to 11 inclusive illustrate curves showing force-displacement or work diagrams to depict the functional characteristics of various types of shock absorbers when used on vehicles having coil spring suspensions and constitute a functional comparison chart of shock absorbers of the open orifice type, closed orifice pop-off valve type or shock absorbers of the compound action type as illustrated and described herein. In the development of these curves force is measured along the vertical while piston displacement is measured along the horizontal on the basis of given piston displacements when the piston moves a predetermined number of strokes per minute.

A shock absorber of the open orifice type is one wherein there is only a fixed constantly open orifice through which oil or other liquid can flow to pass from one side to the other side of the piston during both the impact stroke and the recoil stroke. This type of shock absorber is not provided with the feature of the built-in mechanical or frictional resistance.

A shock absorber of the closed orifice pop-off valve type is one wherein the orifices for the passage of liquid or oil from one side of the piston to the other all are closed by pop-off valves which unseat upon predetermined pressures. This shock absorber also is without the built-in mechanical or frictional resistance feature.

A shock absorber of the compound action type, such as illustrated and described herein, is provided with fixed orifices or openings for the passage of oil or liquid from the underside of the piston to the upper side thereof during the impact or compression stroke and with a fixed orifice and a valve controlled orifice for the passage of oil or liquid through the piston during the recoil stroke. In addition there is a built-in fixed and predetermined frictional or mechanical resistance to the movement of the piston in both directions such as has been described herein.

Figure 6:
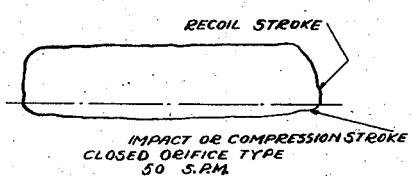

Reference to Figs. 5 and 6 will show that the open orifice type of shock absorber has a more gradual resistance curve than the closed orifice pop-off valve type at a fixed number of strokes per minute as, for example, fifty strokes per minute.

Figure 7:
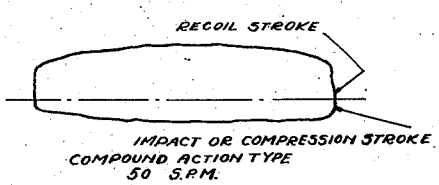
Figure 11:
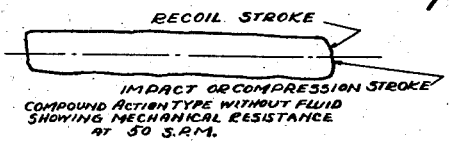

Referring to Fig. 7 it will be noted that the compound action type of shock absorber has a more abrupt resistance curve than even the closed orifice pop-off valve type, and this is due to the added mechanical or frictional resistance to the movement of the piston as illustrated in Fig. 11.

In Fig. 11 the curve represents the action of the compound action type at fifty strokes per minute when the shock absorber has the fluid removed therefrom and the resistance is solely frictional or mechanical resistance. It will be seen that if it were not for the mechanical or frictional resistance Fig. 11 would show substantially no recoil or impact resistances but merely a straight line.

Figure 8:
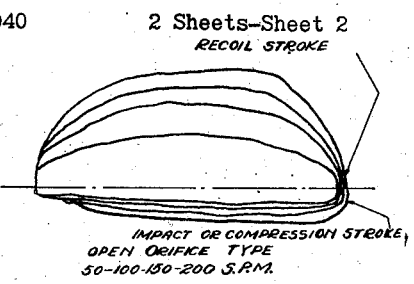
Figure 9:
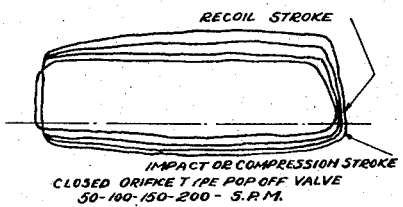
Figure 10:
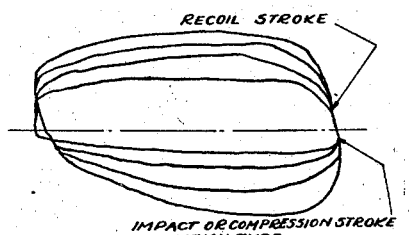

Figs. 8, 9, and 10 illustrate the build-up to maximum resistance to piston displacement as the speed of operation increases of the three different types of shock absorbers, the curves shown in these figures representing, respectively, the action of the shock absorbers at 50, 100, 150 and 200 strokes per minute.

In the compound action type the maximum resistance to piston displacement on the impact or compression stroke is greater in proportion than on the recoil stroke, since there is a greater area on the impact chamber side of the shock absorber than there is on the recoil chamber side thereof, since the latter area is reduced by the amount of the area of the piston rod.

The comparison chart shows that the build-up to maximum resistance to piston displacement in the open orifice type of shock absorber is gradual and slow, and reaches its maximum at an appreciable period after the commencement of the stroke. It will also be noted that the build-up to maximum resistance to piston displacement in the closed orifice pop-off valve type of shock absorber is abrupt and the maximum resistance is quickly reached, after which there is substantially constant resistance to the end of the piston stroke.

It will further be noted that in the compound action type of shock absorber the initial portion of the build-up toward maximum resistance is even more abrupt than in the closed orifice pop-off valve type, but that this initial abrupt build-up toward maximum resistance does not constitute the complete build-up and that subsequent to said initial abrupt partial build-up toward maximum resistance there is a gradual resistance increase up to maximum, somewhat comparable to the gradual increase of the open orifice type.

Therefore in the compound action type of shock absorber there is combined the desirable characteristics of both the open orifice type and the closed orifice type, and, in addition, characteristics not obtainable in either of said last mentioned types of shock absorbers.

As previously stated herein, the shock absorber of the present invention is particularly adapted for use on vehicles employing spring suspensions of the coil spring type. Shock absorbers of the open or closed orifice types not embodying any fixed or predetermined mechanical or frictional resistance are not adapted for use on vehicles employing the coil spring type of spring suspension and do not impart the desired riding qualities to the vehicle.

Although the invention has been described by way of illustration in relation to a direct acting hydraulic shock absorber it will be understood that the invention may be used with other types of fluid shock absorbers.

Although a preferred embodiment of the invention has been illustrated and described herein, it is understood that the invention is susceptible of various modifications and adaptations within the scope of the appended claims.

Having thus described my invention, I claim:

1. In a shock absorber, a cylinder sealed to atmosphere and having a smooth interior surface, a piston having relative reciprocable operative movement therein, means providing for a continuous but variable and controlled passage of fluid from one side of said piston to the other side thereof during relative reciprocation between said cylinder and piston, and means carried solely by said piston for creating a predetermined mechanical or frictional resistance to the relative reciprocation of said piston in said cylinder.

2. In a shock absorber, a cylinder sealed to atmosphere and having a smooth interior surface, a piston having relative reciprocable operating movement therein, means controlling the passage of fluid from one side of said piston to the other side thereof and providing for a greater flow during the relative movement of said piston in one direction than during a portion of the relative movement thereof in the opposite direction, and means carried solely by said piston for creating a predetermined mechanical or frictional resistance to the relative movements in both directions of said piston in said cylinder.

3. In a shock absorber, a cylinder, a piston relatively movable therein, said piston being provided with passages through which fluid may flow during the impact or compression stroke, means for sealing said passages during the recoil stroke, said piston also being provided with a fixed orifice or passage through which fluid may flow during the recoil stroke and with a valve-controlled passage through which fluid may flow during only a portion of said latter stroke, and means carried by said piston for creating a predetermined mechanical or frictional resistance to the relative movement in both directions of said piston in said cylinder.

4. In a hydraulic shock absorber, a cylinder, a piston relatively movable therein, a reservoir, means at one end of said cylinder forming a constantly open restricted communication between it and said reservoir, means sealing the opposite end of said cylinder, said piston being provided with passages through which fluid may flow during movement of said piston toward said one end of said cylinder, means sealing said passages during movement of said piston toward said opposite end of said cylinder, said piston being provided with a fixed or constantly open passage through which fluid may flow during movement of said piston in both directions, said piston also being provided with a valve-controlled passage therethrough through which fluid may flow only during a portion of the movement of the piston toward said opposite end of the cylinder, and means carried by said piston for creating a predetermined mechanical or frictional resistance to the movements of said piston in both directions.

5. In a shock absorber, a cylinder, a piston relatively movable therein, means controlling the passage of fluid from one side of said piston to the other side thereof during relative movement between said cylinder and piston, and means for creating a predetermined mechanical or frictional resistance to the relative movements in both directions of said piston in said cylinder and including a flexible cup-shaped packing ring carried by said piston and a split expansion ring maintaining the wall of said packing ring in engagement with the wall of said cylinder with a predetermined pressure.

6. In a shock absorber, a cylinder, a piston movable therein, said piston being formed of a piston portion and a piston head superimposed thereon, said piston head being provided with a plurality of circumferentially spaced channels terminating at the periphery of said piston head at one end thereof, said piston portion being provided with a plurality of passages therethrough communicating with said channels, a flexible cup-shaped packing ring carried by said piston head and functioning by the pressure of the fluid thereon during movement of the piston in one direction to seal said channels, and means intermediate said piston head and said piston portion for creating a predetermined mechanical or frictional resistance to the relative movements in both directions of said piston in said cylinder.

7. In a shock absorber, a cylinder, a piston movable therein, said piston being formed of a piston portion and a piston head superimposed thereon, said piston head being provided with a plurality of circumferentially spaced channels terminating at the periphery of said piston head at one end thereof, said piston portion being provided with a plurality of passages therethrough communicating with said cylinder and with said channels, a flexible cup-shaped packing ring carried by said piston head and functioning by the pressure of the fluid thereon during movement of the piston in one direction to seal said channels, a second cup-shaped packing ring located intermediate said piston portion and said piston head and carried by the former, and a split expansion ring maintaining the wall of said second packing ring in engagement with the cylinder wall to create a predetermined mechanical or frictional resistance to the relative movements in both directions of said piston in said cylinder.

8. In a shock absorber, a cylinder, a piston movable therein, said piston being formed of a piston portion and a piston head superimposed thereon, said piston head being provided with a plurality of circumferentially spaced channels terminating at the periphery of said piston head at one end thereof, said piston portion being provided with a plurality of passages therethrough communicating with said cylinder and with said channels, a flexible cup-shaped packing ring carried by said piston head and functioning by the pressure of fluid thereon during the recoil stroke to seal said channels, a restricted constantly open passage through said piston, a valve-controlled passage through said piston, a spring tensioned valve controlling said last passage and normally closed during the entire impact or compression stroke and the initial portion of the recoil stroke, a second cup-shaped packing ring located intermediate said piston portion and said piston head and carried by the former, and a split expansion ring maintaining the wall of said second packing ring in engagement with the cylinder wall to create a predetermined mechanical or frictional resistance to the relative movements of said piston and cylinder during both impact and recoil strokes.

9. In a shock absorber, a cylinder, a piston relatively movable therein, means controlling the passage of fluid from one side of said piston to the other side thereof during relative movement between said cylinder and piston, and means for creating a predetermined mechanical or frictional resistance to the relative movements in both directions of said piston in said cylinder and including a flexible cup-shaped packing ring carried by said piston, and means for maintaining the wall of said packing ring in engagement with the wall of said cylinder with a predetermined pressure.

10. In a shock absorber, a cylinder, a piston movable therein, said piston being formed of a piston portion and a piston head superimposed thereon, said piston head being provided with a plurality of circumferentially spaced channels terminating at the periphery of said piston head at one end thereof, said piston portion being provided with a plurality of passages therethrough communicating with said cylinder and with said channels, a flexible cup-shaped packing ring carried by said piston head and functioning by the pressure of the fluid thereon during movement of the piston in one direction to seal said channels, a second cup-shaped packing ring located intermediate said piston portion and said piston head, and means for maintaining the wall of said second packing ring in engagement with the cylinder wall to create a predetermined mechanical or frictional resistance to the relative movements in both directions of said piston in said cylinder.

11. In a shock absorber, a cylinder, a piston movable therein, said piston being formed of a piston portion and a piston head superimposed thereon, said piston head being provided with a plurality of circumferentially spaced channels terminating at the periphery of said piston head at one end thereof, said piston portion being provided with a plurality of passages therethrough communicating with said cylinder and with said channels, a flexible cup-shaped packing ring carried by said piston head and functioning by the pressure of fluid thereon during the recoil stroke to seal said channels, a restricted customarily open passage through said piston, a valve controlled passage through said piston, a spring tensioned valve controlling said last passage and normally closed during the entire impact or compression stroke and the initial portion of the recoil stroke, a second cup-shaped packing ring located intermediate said piston portion and said piston head, and means for maintaining the wall of said second packing ring in engagement with the cylinder wall to create a predetermined mechanical or frictional resistance to the relative movements of said piston and cylinder during both impact and recoil strokes.

12. In a shock absorber, a cylinder, a piston having relative reciprocable operative movement therein, means providing a continuous but variable and controlled passage of fluid from one side of said piston to the other side thereof during relative reciprocation between said cylinder and piston, and means carried solely by said piston for creating a predetermined mechanical or frictional resistance to the relative reciprocation of said piston in said cylinder.

EUGENE LESTER BEECHER.